United States Patent
Tecchiolli et al.

(10) Patent No.: US 6,891,144 B2
(45) Date of Patent: May 10, 2005

(54) PHOTO-SENSITIVE ELEMENT FOR ELECTRO-OPTICAL SENSORS

(75) Inventors: Giampietro Tecchiolli, Trento (IT); Alvise Sartori, Povo (IT)

(73) Assignee: Neuricam SpA, Trento (IT)

( * ) Notice: Subject to any disclaimer, the term of this patent is extended or adjusted under 35 U.S.C. 154(b) by 0 days.

(21) Appl. No.: 10/463,422

(22) Filed: Jun. 18, 2003

(65) Prior Publication Data

US 2003/0234345 A1 Dec. 25, 2003

(30) Foreign Application Priority Data

Jun. 19, 2002 (IT) .................................... UD2002A0139

(51) Int. Cl.[7] .............................................. H01L 27/00
(52) U.S. Cl. .................... 250/208.1; 257/292; 348/301; 348/308
(58) Field of Search .......................... 250/208.1, 214.1; 257/290, 291, 292, 443, 444, 461; 348/300, 301, 302, 308, 310

(56) References Cited

U.S. PATENT DOCUMENTS

| | | | |
|---|---|---|---|
| 5,025,146 A | | 6/1991 | Kleinschmidt et al. |
| 5,608,204 A | | 3/1997 | Hofflinger et al. |
| 6,355,965 B1 | * | 3/2002 | He et al. .................... 257/431 |
| 6,410,899 B1 | * | 6/2002 | Merrill et al. ........... 250/208.1 |
| 2002/0024058 A1 | * | 2/2002 | Marshall et al. ............ 257/170 |
| 2003/0234344 A1 | * | 12/2003 | Lai et al. ................. 250/208.1 |

FOREIGN PATENT DOCUMENTS

| | | |
|---|---|---|
| DE | 10123853 | 11/2002 |
| GB | 2374926 | 10/2002 |
| JP | 2001250933 | 9/2001 |
| WO | 9721304 | 6/1997 |
| WO | 9949571 | 9/1999 |
| WO | 02093904 | 11/2002 |

OTHER PUBLICATIONS

U.S. patent Publication No. 2001/010548 published Aug. 2, 2001 in the name of Kakumoto et al.
U.S. Patent Application No. US 2002/0018132 A1 (U.S. Appl. No. 09/874,754), Watanabe, filed Jun. 5, 2001, published Feb. 14. 2002.
Ulrich Seger et al., "Vision Assistance in Scenes with Extreme Contrast", 1993, pp. 15–54.

* cited by examiner

*Primary Examiner*—Kevin Pyo
(74) *Attorney, Agent, or Firm*—Stevens, Davis, Miller & Mosher, LLP

(57) ABSTRACT

Photo-sensitive element for electro-optical sensors realised with the CMOS technology, comprising a photo-sensitive reception member (11, 31) consisting of a diode connected to a conversion circuit to convert the current generated by the photo-sensitive reception member (11, 31) into a tension signal, and an amplification and reading circuit (20, 40). The circuit comprises two transistors (21, 22; 41, 42), arranged in a diode configuration with the drain short-circuited with its own gate, the two transistors (21, 22; 41, 42) being connected in series there between and able to perform a logarithmic conversion of the current, photo-generated by the reception member (11, 31), in continuous time and without requiring time to integrate the light. The photo-sensitive element further comprises a third transistor (23, 43) having its gate connected to a photo-sensitive node (25, 45) at an output of the photo-diode (11, 31) to achieve a first stage of amplification in current of the signal by transferring the tension present on the node (25, 45) to the drain of a fourth transistor (24, 44).

14 Claims, 2 Drawing Sheets

PHOTO-SENSITIVE ELEMENT FOR ELECTRO-OPTICAL SENSORS

FIELD OF THE INVENTION

The present invention concerns a photo-sensitive element, realised with the CMOS technology and used in electro-optical sensors, suitable to detect an incident light and to convert it into a correlated electric signal.

The photo-sensitive element according to the invention is used to make electro-optical sensors of a two-dimensional linear or matrix type which can be used in various electronic devices for artificial vision, such as for example digital video cameras, intelligent optical sensors or otherwise.

The photo-sensitive element according to the invention is particularly suitable for applications which require to detect images in the presence of uncontrolled light, hence characterized by variable intensity over a wide interval, for example to make electro-optical sensors used in the field of automobiles, in security controls, in road safety control and in traffic control.

BACKGROUND OF THE INVENTION

The state of the art includes optical sensors consisting of a plurality of photo-sensitive elements, or pixels, able to detect light signals and to transmit them, in the form of electric signals, to a calculator which processes them and obtains images from them which it transmits to display devices; the latter are then able to allow a user to see the images or information deriving therefrom.

Previously, such optical sensors were usually made using CCD technology (Charge-Coupled Device), which guarantees a very satisfactory image quality in the presence of a well controlled illumination, but are not able to operate optimally in the presence of a light with an intensity which is greatly differentiated inside the same scene, that is, with an input signal having high dynamics, up to 120 dB.

CCDs are also not very versatile from various points of view: they cannot easily be integrated with complex pilot circuits in a single silicon support or microchip, it is not possible to arbitrarily select one or more pixels inside the matrix sensor and it is possible to acquire the images only after having waited a latency time correlated to the integration time, or exposure, of each pixel to the light.

To overcome some of these shortcomings of CCDs, optical sensors have been developed based on the CMOS type silicon technology (Seger, Graf, Landgraf—"Vision Assistance in Scene with extreme Contrast"—IEEE Micro, vol. 13 page 50, February 1993), which offer a good result in very differentiated lighting conditions inside the same scene.

This result is obtained by means of a conversion on logarithmic scale of the signal inside the photo-sensitive element or pixel.

The logarithmic conversion, obtained for example by connecting one or more MOS type transistors in diode configuration to the photo-sensitive joint, as described in U.S. Pat. No. 5,608,204 or in JP 2001 250933 A, suffers in any case from the fundamental disadvantage that it supplies very weak output signals.

In JP'933, the gate of a third amplifying transistor T2 is connected to the gate of the first transistor T1 which makes the logarithmic conversion of the signal and not directly to the photo-sensitive element.

US 2001/0010548 does not disclose a circuit having two transistors connected in series and with the respective gate and drain short-circuited for obtaining the logarithmic conversion of the signal.

The prior art solutions tend to create difficulties in designing the signal amplifiers able to read the signals of the pixels and makes the sensors not very suitable for monolithic integration on a single microchip together with other circuits of a digital type, since they are excessively sensitive to the electric noise inevitably generated by such digital circuits.

The present Applicant has devised and embodied this invention to overcome the shortcomings of the state of the art and to obtain further advantages.

SUMMARY OF THE INVENTION

The present invention is set forth and characterized essentially in the main claim, while the dependent claims describe other innovative characteristics of the invention.

The purpose of the invention is to achieve a photo-sensitive element for electro-optical sensors which can be integrated into a silicon support element, or substrate, of limited size, so as to achieve a microchip, which will supply good quality images at a high repetition frequency even when there is an input signal characterized by high dynamics.

To be more exact, the purpose of the invention is to obtain an output signal, deriving from the logarithmic conversion of an input signal, of a sufficiently high value to allow an efficient processing and good immunity with respect to the electric noises generated by the other components present on the microchip where the photo-sensitive element is installed.

A further purpose is to achieve a conversion circuit which does not require time to integrate the light inside the photo-sensitive element.

In accordance with such purposes the photo-sensitive element according to the present invention consists of a photo-sensitive reception means, such as an inversely polarized diode, and a circuit consisting of at least two MOSFET type transistors, either of a N-type or of a P-type, connected in series between each other, operating both as a logarithmic conversion circuit of the current photo-generated by the photo-diode under tension, and also as a circuit to polarize the photo-diode.

According to the invention, the two MOSFET type transistors are in a diode configuration, that is, with the respective gates and drains short-circuited.

According to a preferential embodiment of the invention, the logarithmic conversion circuit of the photo-generated current comprises a variable number of from two to twelve transistors located in series, to obtain a corresponding increase in the conversion gain and to proportionally increase the level of the tension signal output.

According to the invention, an amplification and reading circuit is provided which consists of at least a third transistor having its gate directly connected either to the cathode or to the anode of the photo-diode, dependent of the configuration of N-type or of P-type of the photo-sensitive element.

The configuration with two transistors connected to the photo-sensitive joint is mainly characterized by the high entity of the tension signal produced in response to a given light stimulus (photo-generated current) at input, by the capacity of detecting the light radiation in a wide interval of intensity, up to 120 dB, and by the possibility of making sensors whose photo-sensitive elements are accessible at any moment of time according to any sequence decided by the user.

Compared with a single transistor configuration, by using two transistors arranged in series, given the same light signal input, we obtain an increase in the logarithmic conversion gain by a factor of about 2.

Moreover, the great dimensions of the signal generated allow to maintain a good level of the signal-noise ratio of the device and consequently to make an optimum integration in silicon on a single microchip of the photo-sensitive element together with signal processing devices in order to achieve small size sensors and hence with reduced production costs, highly reliable and usable in different applications.

To be more exact, the functioning of the device is based on the generation of a current directly proportional to the light incident on the photo-diode, which, being inversely polarized, has a large emptied zone wherein electron-hole couples are generated.

The current is converted into a tension signal using, as we said, at least two transistors located in series and whose gate electrodes are suitably polarized by a connection between the gate of every transistor and the respective drain terminal of the same transistor.

This circuit configuration is particularly suitable to obtain a conversion gain in the incident light-tension of about n times what is obtained using existing solutions with a single conversion transistor, where n is the number of transistors in series, and to increase by a corresponding factor the signal-noise ratio in the presence of external noises carried by the silicon substrate.

Given the high impedance existing at the ends of the two polarization transistors, and the need to transfer the tension signal, a third transistor is arranged to perform a first amplification of the signal, while a fourth transistor, which can be selectively enabled, allows to connect the photo-sensitive element to a signal transmission line, called bitline.

Since the current is continually transformed into tension, without needing to integrate the light, the signal can be read at any moment whatsoever and addressing any photo-sensitive element whatsoever, simply by enabling the fourth transistor of the pixel to be read.

BRIEF DESCRIPTION OF THE DRAWINGS

These and other characteristics of the present invention will be apparent from the following description of a preferential form of embodiment, given as a nonrestrictive example, with reference to the attached drawings in FIGS. 1 and 2 which show an electric diagram of two photo-sensitive elements according to the invention.

DETAILED DESCRIPTION OF A
PREFERENTIAL EMBODIMENT

Figure 1:
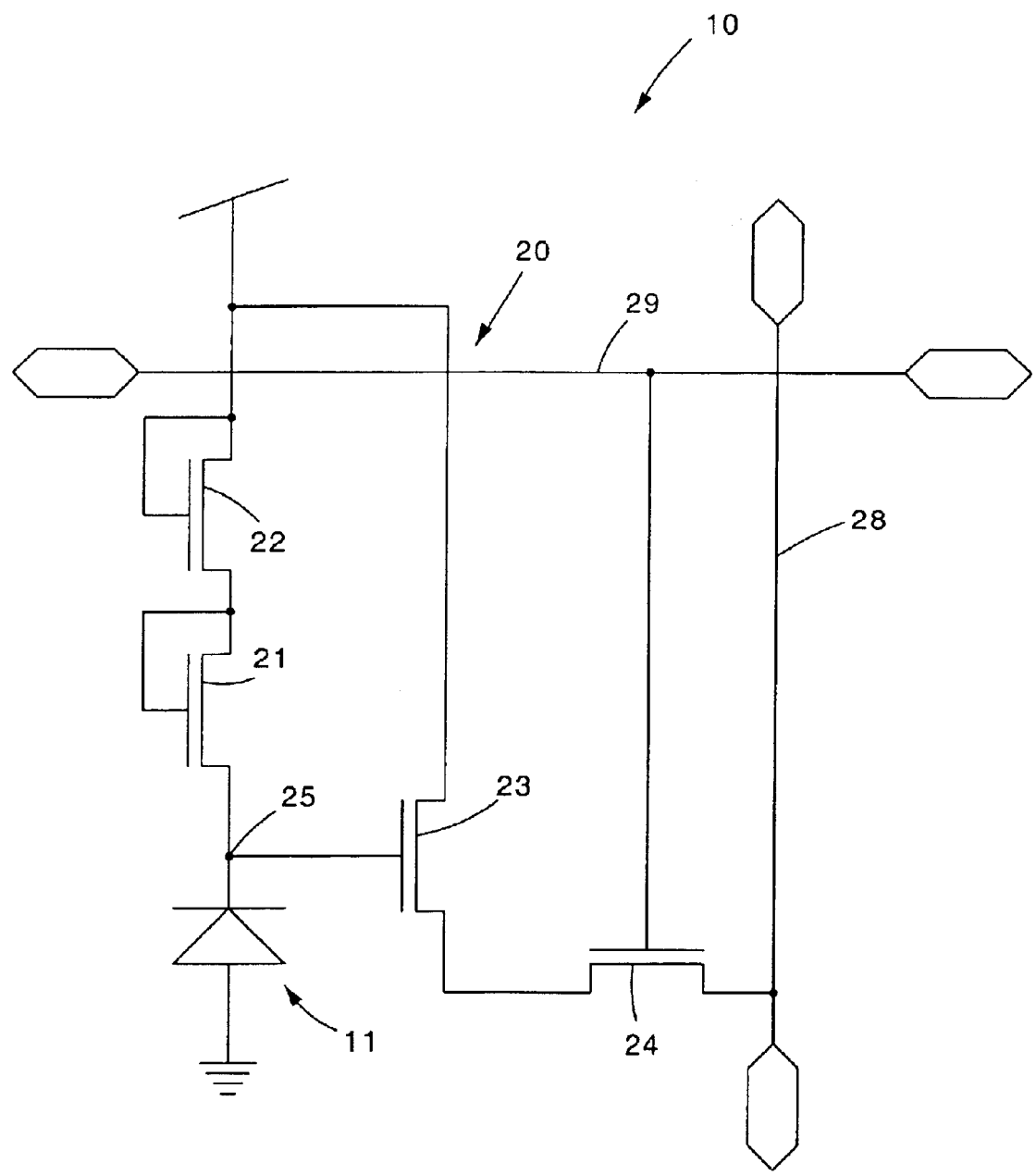

With reference to the attached drawing of FIG. 1, a photo-sensitive element or pixel 10 according to a first embodiment of the invention consists of an inversely polarized diode 11 of N-type, two transistors of N-type, respectively a first 21 and a second 22, to polarise the photo-diode 11, and an amplification and reading circuit 20 comprising two transistors, respectively third 23 and fourth 24.

The pixel 10 is of the type able to detect light of a wavelength between 400 and 1000 nm and an intensity which varies in an interval of at least 6 decades, between $10^{-3}$ and $10^{-3}$ W/m$^2$, and is able to constitute the single cell of a multiple cell matrix sensor made entirely with CMOS technology and hence able to be integrated in a chip.

The diode 11 is made by a joint between an N type insulated diffusion, medium doped, called Nwell, and the silicon substrate which is weak doped. The interface area between the two parts of the diode is emptied of free loads and characterized by the presence of an internal electric field which can be increased by inversely polarizing the diode even from outside. To this purpose a mass contact has been put in the structure in the substrate and the diffusion Nwell has been connected to a positive tension by means of the two transistors 21 and 22.

In the emptied zone, the light generates electron-hole pairs which are separated from the electric field of the joint, giving origin to a current directly proportional to the incident light.

The conversion of the current, photo-generated by the incident light signal, to a tension signal is guaranteed by the two transistors 21 and 22 which characterize the present invention.

As a result of their diode configuration, with the drain short-circuited with its own gate, the photo-generated current which passes through them, which is low intensity, forces both to work in a so-called sub-threshold regime, that is, it imposes a logarithmic type relation between the tension at the photo-sensitive node 25 and the photo-generated current.

Moreover, by using two transistors 21 and 22, instead of a single transistor as in the state of the art, we increase the tension gain of the pixel 10, since we increase by a factor of about two the slope of the function which connects the tension to the current, especially improving the signal-noise ratio.

The diode 11 occupies about 40% of the total surface of the pixel 10, and has a good conversion efficiency throughout the whole spectrum of the visible and nearby infra-red light.

In fact, as a result of the characteristics of the photo-diode, particularly the depth of the joint, which is at about 2 $\mu$m from the surface and the level of doping of the Nwell diffusion and the substrate, the pixel 10 has maximum sensitivity to radiation in the nearby infra-red, between about 800 and about 1000 nm, because this radiation is composed of photons of energy suitable to penetrate the silicon and reach the emptied area of the photo-diode and there generate pairs of electric loads.

The amplification and reading circuit 20 substantially consists of a third transistor 23 and a fourth transistor 24, each of which has its own specific function.

The transistor 23, made according to the conventional configuration called tension follower, or common drain or source follower, is directly connected to the cathode of the diode 11; it achieves the first stage of amplification in tension of the signal, transferring the tension present on the photo-sensitive node 25 to the drain of the fourth transistor 24, with a gain in tension near to one; enabling the fourth transistor 24 allows to connect the pixel 10 with an output line 28 (called bitline) with the advantage of transferring the tension of the photo-sensitive node 25 to the bitline without losses, something which would not be possible in the absence of the third transistor 23.

The pixels 10 made in this way are organized in a two-dimensional matrix for the vision of complete scenes, but every sub-sampling of the matrix into subsets is possible.

Figure 2:
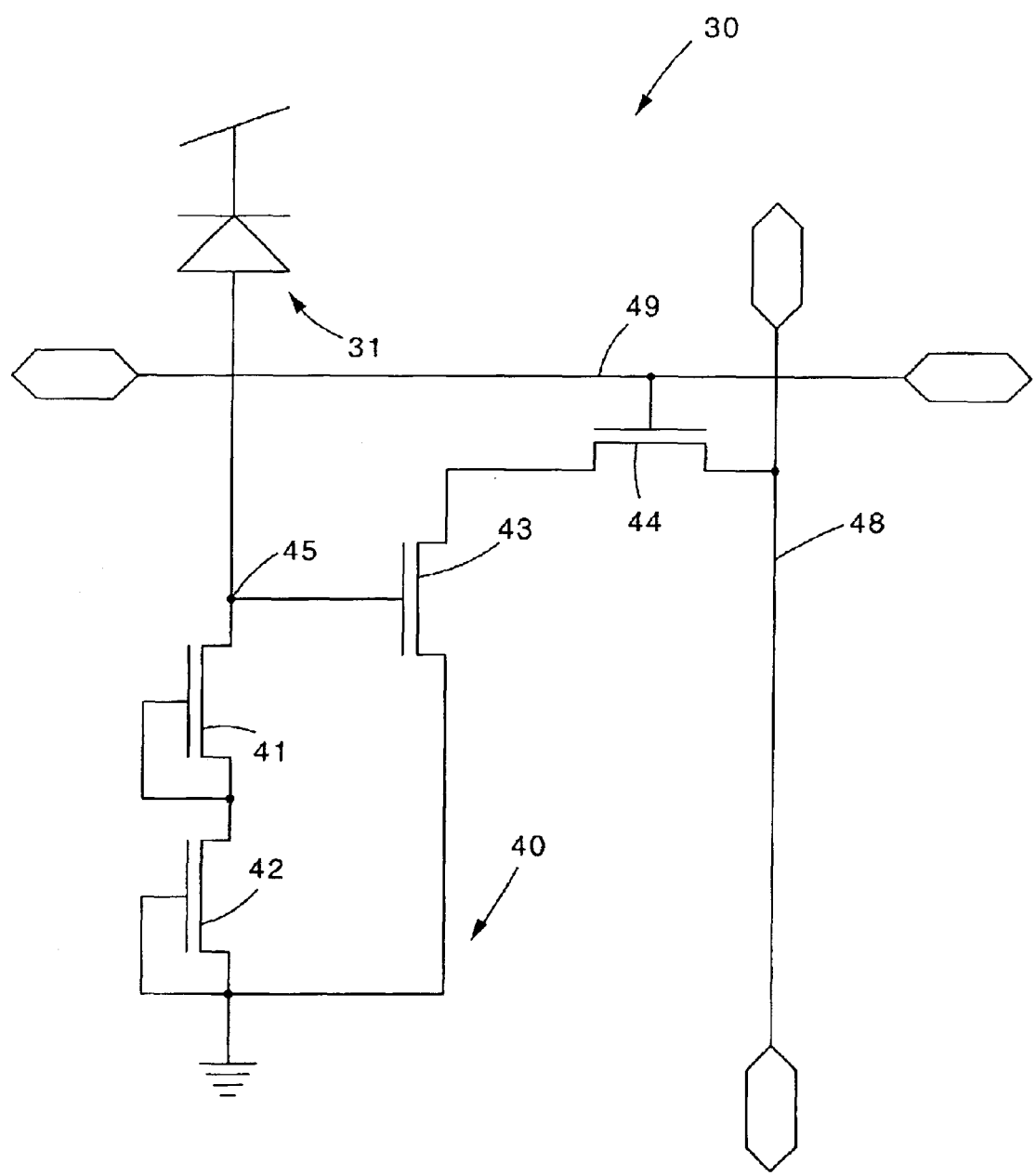

A second complementary configuration of the pixels, shown in FIG. 2, is possible. In this second configuration, the polarity of the diode is inverted, all the N-channel transistors are replaced by P-channel transistors, while the positive feed terminals and the mass are inverted. This configuration has a very similar functioning to that of the configuration described above.

In particular, in the complementary solution the photo-sensitive element or pixel 30 consists of a diode 31 of the P-type, made by a joint between a P-type insulated diffusion, and contained in a N-type diffusion, able to define an interface area which is emptied of free loads and characterised by the presence of an internal electric field.

The diode 31 has its cathode connected to a supply line and its anode connected to a circuit which converts the current generated by said diode 31 in a voltage signal. The conversion circuit comprises two transistors of the P-type, respectively a first 41 and a second 42, to polarise the photo-diode 31, and an amplification and reading circuit 40 comprising two transistors, respectively third 43 and fourth 44.

As seen above, the diode configuration of the transistors 41, 42, imposes a logarithmic type relation between the tension at the photo-sensitive node 45 and the photo-generated current.

The third transistor 43 has its gate directly connected with the anode of the diode at the node 45, is in the configuration called tension follower, or common drain or source follower. The third transistor 45 achieves the first stage of amplification in tension of the signal, transferring the tension present on the photo-sensitive node 45 to the drain of the fourth transistor 44, with a gain in tension near to one. As above, enabling the fourth transistor 44 allows to connect the pixel 30 with an output line 48 (called bitline) with the advantage of transferring the tension of the photo-sensitive node 45 to the bitline 48 without losses, something which would not be possible in the absence of the third transistor 43.

Given that the current is continually transformed into tension, the signal can be read at any moment whatsoever, with a frequency of reading which can even reach 20 MHz, identifying any pixel 10 in the matrix. In order to read, it is sufficient to enable the fourth transistor 24, by means of a signal carried through a selection line 29, and to connect the corresponding output line 28 to a global line, which takes the signal to an amplifier and subsequently to an analogical-digital converter, which are not shown in the drawing.

A standard 0.35 μm technology can be used to make the sensor, that is, a process to make the microelectronic circuits in silicon characterized by transistors with a minimum gate length of 0.35 μm, in order to obtain photo-sensitive elements with satisfactory electro-optical characteristics without having to develop a dedicated technology.

It is clear that modifications and variants can be made to the photo-sensitive element 10 as shown heretofore, all of which shall come within the field of protection of the present invention as defined by the attached claims.

What is claimed is:

1. Photo-sensitive element for electro-optical sensors realized with CMOS technology, comprising at least
    a photo-sensitive reception member consisting of a diode connected to a conversion circuit to convert the current generated by said photo-sensitive reception member into a tension signal, and
    an amplification and reading circuit,
    said conversion circuit comprising at least two transistors, arranged in a diode configuration, each one having its drain short-circuited with its own gate, wherein said at least two transistors are of the N-type, the source of a first of said at least two transistors is connected with the drain of another of said at least two transistors, whose source is further connected with the cathode of said photo-diode to define a photo-sensitive node and to provide a logarithmic conversion of said current, photo-generated by said reception member into a corresponding tension, in continuous time and without requiring time to integrate the light,
    the amplification and reading circuit comprising at least a third transistor of the N-type, having its gate connected to said photo-sensitive node to achieve a first stage of amplification in tension of the signal by transferring the tension present on said photo-sensitive node to the source of said third transistor.

2. Photosensitive element as in claim 1, wherein said diode is of the N-type and is inversely polarized, at least said first, second and third transistors are of the N-type, and said diode cathode is connected to the conversion circuit comprising said first and second transistors and to the reading and amplifying circuit comprising said third transistor and a fourth transistor.

3. Photo-sensitive element as in claim 2, wherein said N-type diode consists of a joint between an insulated N-type diffusion and a P-type silicon substrate, able to define an interface area emptied of free loads and characterised by the presence of an internal electric field.

4. Photo-sensitive element as in claim 1, wherein said diode is of the P-type, and said diode has an anode connected to the conversion circuit comprising said first and second transistors and to the reading and amplifying circuit comprising said third transistor and a fourth transistor.

5. Photo-sensitive element as in claim 4, wherein said P-type diode consists of a joint between an insulated P-type diffusion, and contained in an N-type diffusion, able to define an interface area emptied of free loads and characterized by the presence of an internal electric field.

6. Photo-sensitive element as in claim 1, comprising a variable number from two to twelve of said transistors able to convert the current generated by said photo-diode in a voltage signal, to increase by a corresponding value the logarithmic conversion gain of said current photo-generated by said photo-sensitive reception means.

7. Photo-sensitive element as in claim 1, wherein said amplification and reading circuit comprises a fourth transistor to connect the photo-sensitive element to a signal transmission line.

8. Photo-sensitive element as in claim 7, wherein said fourth transistor is able to be selectively enabled to allow the signal relating to the photo-sensitive element selected to be read at any moment whatsoever.

9. Photo-sensitive element as in claim 1, wherein the photo-sensitive element is able to detect the light of a wavelength of between 400 and 1000 nm and an intensity varying in an interval of at least 6 decades, between $10^{-3}$ and $10^3$ W/m$^2$.

10. Photo-sensitive element as in claim 1, wherein the photo-sensitive element is able to be entirely integrated into a silicon substrate of limited size, to achieve a microchip.

11. Photo-sensitive element as in claim 1, wherein the photo-sensitive element is able to constitute a cell of a linear or matrix multiple cell sensor.

12. Photo-sensitive element for electro-optical sensors realized with CMOS technology, comprising at least
    a photo-sensitive reception member consisting of a diode connected to a conversion circuit to convert the current generated by said photo-sensitive reception member into a tension signal, and
    an amplification and reading circuit,
    said conversion circuit comprising at least two transistors, arranged in a diode configuration, each one having its drain short-circuited with its own gate, wherein said at least two transistors are of the P-type, the source of a first of said at least two transistors is connected with the drain of another of said at least two transistors, whose source is further connected with the anode of said photo-diode to define a photo-sensitive node and to provide a logarithmic conversion of said current, photo-generated by said reception member into a corresponding tension, in continuous time and without requiring time to integrate the light, the amplification and reading circuit comprising at least a third transistor of the P-type, having its gate connected to said photo-sensitive node to achieve a first stage of amplification in tension of the signal by transferring the tension present on said photo-sensitive node to the source of said third transistor.

13. Photosensitive element as in claim 12, wherein said diode is of the P-type and is inversely polarized, at least said first, second and third transistors are of the P-type, and said diode cathode is connected to the conversion circuit comprising said first and second transistors and to the reading and amplifying circuit comprising said third transistor and a fourth transistor.

14. Photo-sensitive element as in claim 13, wherein said P-type diode comprises a joint between an insulated P-type diffusion and an N-type silicon substrate, able to define an interface area emptied of free loads and characterized by the presence of an internal electric field.

* * * * *